Sept. 7, 1943.   R. H. PARK   2,328,996
SYNCHRONOUS GENERATOR AND MOTOR STABILIZATION
Filed Feb. 13, 1942   2 Sheets-Sheet 1
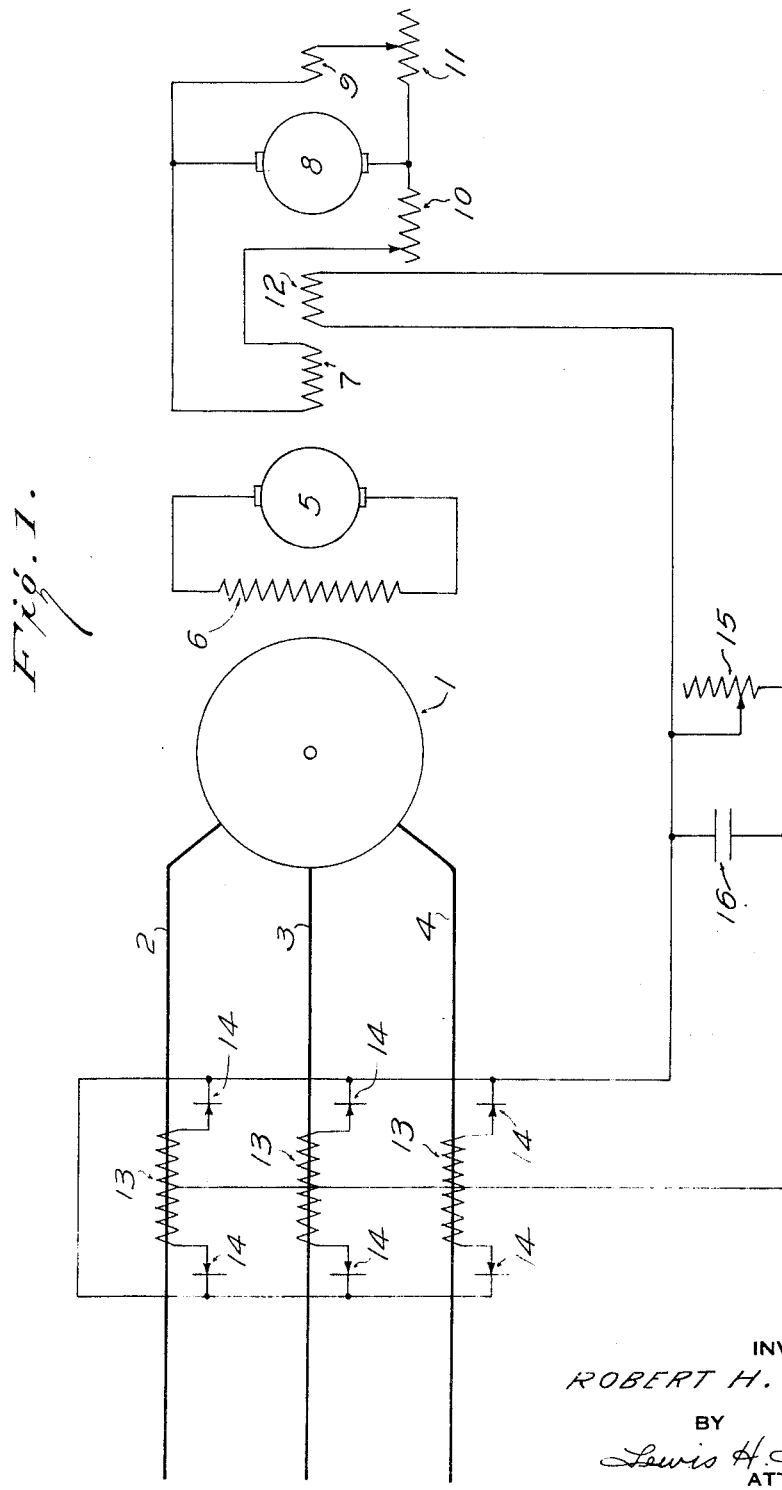
INVENTOR
ROBERT H. PARK,
BY
Lewis H. Lanman
ATTORNEY

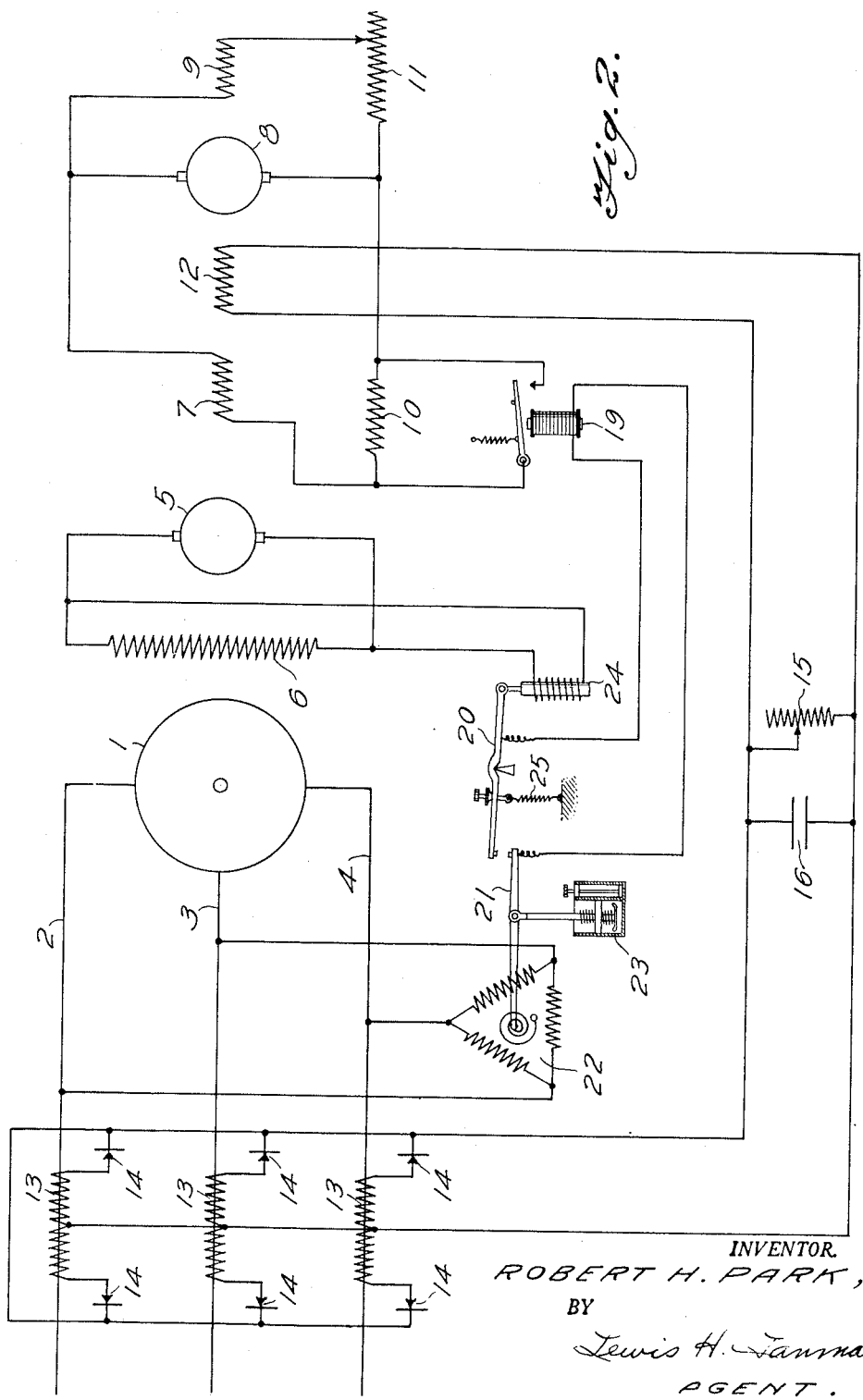

Patented Sept. 7, 1943

2,328,996

UNITED STATES PATENT OFFICE 2,328,996

SYNCHRONOUS GENERATOR AND MOTOR STABILIZATION

Robert H. Park, Washington, D. C., assignor to American Cyanamid Company, New York, N. Y., a corporation of Maine Application February 13, 1942, Serial No. 430,830

3 Claims. (Cl. 171—119)

This invention relates to the excitation of alternating current machines and more particularly to regulating means for stabilizing synchronous alternating current machines.

The present application is a continuation-in-part of my copending application Serial No. 336,831, filed May 23, 1940, now Patent No. 2,303,229, November 24, 1942, which discloses regulating means for stabilizing synchronous alternating machines, the fields of which are excited by D. C. generators of the self-excited or shunt type.

This invention is particularly directed to the provision of stabilizing means for synchronous alternating current machines, the fields of which are excited by a sub-excited generator.

The maximum load that can be carried by a synchronous machine depends upon stability limit, which in turn is affected, in the case of a generator, by the effect of the connected load and the connections to the load, and, in the case of a motor, by the electrical characteristics of the source of power.

It is known that the stability of a synchronous machine can be increased by increasing the air gap between the rotor and the stator. This type of stability which is attained without benefit of automatic control devices is referred to as "inherent stability." When the air gap is increased, however, the number of ampere turns applied to the field winding must be increased to obtain the necessary flux, and this results in a lower efficiency because of the increased heat losses, and increases the size and cost of the machine for a given capacity.

It is also known that when a short circuit or sudden, relatively large increment of load is thrown on a line, the synchronous generator field current is momentarily increased corresponding to the increase in armature current, but this current then dies off as a transient because there has been no corresponding change in the field voltage to sustain it. The same effect and situation is obtained when a sudden load is thrown on a synchronous motor. It has been proposed to provide synchronous machines with devices responsive to machine armature voltage or current or both which operate to increase the field excitation when the armature voltage drops or when the armature current increases. Stability attained by the action of these automatic devices is referred to as "dynamic stability." It is with an improved device responsive to any increase in armature current that my invention is particularly concerned. Such an improved device eliminates the necessity for having a large air gap in order to keep the machine in synchronization, thereby increasing the efficiency and utility of the synchronous machines.

In order to shift the responsibility for maintaining synchronism onto the excitation system, the regulating device controlling the amount of field excitation must possess the following characteristics:

1. It must never stick or fail to function.
2. It must be sufficiently fast to follow within a small fraction of a second the change in excitation required, otherwise the transient field current built up by the change in armature current will die away.
3. The "ceiling" voltage of the exciter must be sufficient to take care of any demands, otherwise the machine cannot maintain its voltage under abnormal conditions.

A synchronous alternator controlled by even a sensitive type of voltage regulator, as a Tirrill or vibratory type of regulator, behaves for sudden changes of load much the same as if it were operating at a constant field voltage. The terminal voltage must first change, causing a change in the setting of the contacts, before a corresponding change in the exciting voltage takes place. Furthermore, regulators of the mechanical type are apt to stick or fail. Even an occasional failure operates to thwart the commercial success of such machines.

It has also been proposed to supplement the field current applied to the synchronous machine from the exciting generator by connecting in series therewith transformers connected to the transmission line, the alternating current generated being rectified by vapor arc rectifiers. Such a device gives an almost instantaneous response in changing the excitation in proportion to the armature current, but is subject to failure when the arc becomes extinguished, and also is expensive in the case of large synchronous machines because of the heavy transformers required and the large arc rectifiers necessary to convert the high currents which may be generated.

In accordance with my invention improved means are provided for instantaneously changing the excitation of synchronous machines in accordance with the armature current. My invention provides for the supplying of a current proportional to the armature current to furnish part of the excitation for the exciter for the synchronous machine.

To so provide a portion of the excitation for the exciter for the synchronous machine, an auxiliary field winding for the exciting generator is connected through rectifying means, such as a dry-type rectifier, to the armature leads of the synchronous machine. In this manner it may be seen that with increase in load on the synchronous machine, a corresponding increase in excitation of the synchronous machine will result, since the excitation of the exciting generator will be increased with a consequent increase in the voltage across the field of the synchronous generator or motor.

Since my invention is primarily concerned with increasing the stability limit of synchronous alternating machines the auxiliary winding is adapted to provide a substantial portion of the excitation for the exciting generator at full load conditions. Such an arrangement makes possible the production of sufficient additional excitation in response to any increase in armature current to prevent the machine from "pulling out of step," even though, due either to the use of a small air gap in the synchronous machine, or in view of the impedance and charging current of the lines, the machine would inherently be unstable, i. e., would pull out of step, even under steady load conditions were the excitation to be held constant at the same average value maintained by the devices of the present invention.

With these relations existing, in the case of a self-excited exciter for the synchronous machine, if operating under varying load conditions, a sudden load lift with consequent reduction of armature current would cause the excitation in the auxiliary field to diminish proportionately. The voltage of the exciting generator would drop off and a cumulative effect would be produced, since as a consequence of such voltage drop, less current would flow in the shunt field circuit of the self-excited exciter and a still lower voltage would obtain.

This would not result in machine instability because under the light load the voltage will diminish only to the point where the excitation in the auxiliary field furnished by the armature current drawn from the line will establish equilibrium. However, abnormally low armature voltage of the synchronous machine and poor voltage regulation in the overall operation of the machine will be the ultimate disadvantages encountered.

To obviate this condition a voltage regulator was provided for the self-excited exciter which operated to cut out resistance in the shunt field of the exciter upon decrease in machine armature voltage, as set forth in the above-referred to application. This procedure was necessary in order to obtain increased stability without inducing undue fluctuations in machine armature voltage.

My invention herein described contemplates the utilization of a sub-exciting generator to supply part of the excitation for the exciting generator. The sub-exciter in turn is self-excited. The advantage obtained constitutes an improvement over the use of a self-excited generator in that equally increased machine stability is accomplished, while at the same time fluctuations in the machine armature voltage are confined to a relatively narrow range.

Under varying load conditions, if a sudden load lift occurs the excitation supplied by the auxiliary field of the sub-excited exciter will diminish.

However, the magnitude of the machine armature voltage drop is greatly reduced as compared to the voltage drop in the case of the self-excited exciter because the armature voltage of the sub-exciter is independent of the excitation furnished by the auxiliary field and no cumulative effect results.

In other words, the excitation of the main field of the exciter supplied by the sub-exciter remains constant. Consequently abnormally low machine armature voltage will not result. It follows, therefore, that there is a marked advantage in employing a sub-exciter when a stabilizing arrangement, such as described, is to be adopted. As a result the sub-excited exciter may be utilized with or without a voltage regulator.

My invention may be best understood by reference to the following description taken in connection with the accompanying drawings in which Fig. 1 is a diagrammatic showing of a preferred form of my invention applied to a synchronous generator, and Fig. 2 is a modified form. Corresponding parts in the two diagrams are designated by like reference characters.

Referring to Fig. 1 of the drawings, 1 denotes a three-phase alternating current generator providing alternating current to the transmission lines 2, 3 and 4. Reference character 5 denotes the direct current exciter generator which is mounted on the shaft of the synchronous A. C. generator, and which supplies the current to the field winding 6 of the A. C. generator. The exciting current for the exciting generator is in part supplied by the sub-exciting generator 8, which is also mounted on the A. C. generator shaft and supplies direct current to main exciter field winding, 7. The sub-exciting generator is itself self-excited by passing a portion of its generated current through shunt field, 9. Variable resistances 10 and 11 are provided so that any desired apportionment of the sub-exciter generator current may be made.

In addition to the main field winding 7, I provide the exciter with an auxiliary field winding 12, which is supplied with a direct current proportional to the alternating current flowing in the transmission lines 2, 3 and 4. This current is provided by placing a small current transformer, 12, on each of the transmission lines 2, 3 and 4. These three transformers, 13, are mid-connected in series and connected to one side of the auxiliary field winding, 12. The end connections of the transformers, 13, are connected first to copper oxide rectifiers, 14, and then connected back-to-back in series to the other terminal of the auxiliary field winding, 12. A variable resistance 15, and a capacitor, 16, are connected in parallel across the auxiliary field winding. These serve to iron out the fluctuations in the direct current passing through the rectifiers, and the variable resistance may also be used to regulate the proportion of the current which will pass through the auxiliary field winding.

Referring to Fig. 2 of the drawings, a modified form of my invention is shown, in which a voltage regulator is provided to control the resistance 10 in the main field circuit of the sub-excited exciter 5. The employment of a voltage regulator will obviate even the small variations in machine armature voltage occurring with fluctuations in load or machine armature current.

For this purpose, I prefer to use, as shown on the drawings, a regulator substantially similar to that described in my prior U. S. Patent No. 1,743,798. Relay 19, when closed, will cut out resistor 10 and is actuated by the closing of the contact ends on contact arms 20 and 21. The contact arm, 21, is actuated by a dynamo-electric device, 22. The motion of the contact arm, 21, is modified by damping means, 23. Contact arm, 20, is actuated by solenoid, 24, opposing the action of which is a spring, 25. Solenoid, 24, is arranged to be energized in accordance with the electrical characteristics of the alternator field circuit, 6. Closing of the contacts on the contact arms, 20 and 21, will energize and close relay 19, the relay circuit, of course, being supplied with some source of power (not shown), which will short circuit resistor, 10.

As explained more in detail in my prior patent mentioned above, increasing line voltage will increase the torque of dynamoelectric device 22, intended to lower contact arm 21, thereby decreasing the time during which the relay circuit is energized. On the other hand, decreasing line voltage will decrease the torque of device 22, thus increasing the time during which the relay circuit is energized. The operation of this regulator will serve to maintain normal voltage automatically, independently of manual adjustments. Although the voltage regulator is subject to failure and sticking of contacts, as are all mechanical regulators, it is merely an auxiliary regulator which serves the function of preventing even small variations in armature voltage with load and failure to operate will not result in machine instability.

By the use of the term "transmission line" in the above discussion of the operation of my invention, I do not intend that the invention should be limited to a transmission line extending over considerable distances, as the term is generally understood. The invention is equally applicable to situations where a motor-generator set is operated in closed proximity to each other and the power lines connecting these machines are relatively short.

The voltage regulator shown is by way of illustration only and obviously any type of voltage regulator might be used to control the resistance in the main field circuit.

From the above examples it will be seen that my invention broadly consists in supplying an auxiliary field to the exciting generator whose excitation current instantly varies in accordance with the armature line current. Any change in the excitation of auxiliary field, 12, produces a change in the voltage of the exciting generator 5, and a corresponding change in the excitation of the A. C. generator field 6. The change in field excitation is practically instantaneous with the change in armature current caused by the load change on the generator or motor. Furthermore, my improved system for "dynamic stabilization" is reliable in operation and simple and inexpensive in construction. No moving parts are present which render it subject to mechanical failure. Since I do not attempt to supply additional field directly with increasing armature current or decreasing terminal voltage of the synchronous machine, but rather produce changes in the excitation indirectly by changing the excitation of the exciting generator, it is only necessary to use relatively small amounts of current in my control device. Hence, I am able to use small transformers, which are inexpensive, and I am also able to readily use the rugged and dependable dry, chemical rectifiers as the well known copper oxide rectifier, the selenium rectifier, and the like. Such rectifiers have the further advantage of low cost, especially when the power requirements placed on the rectifier does not require them to be of excessive size. The copper oxide type rectifier is much to be preferred over the tube or vapor arc rectifier since these are subject to failure, may become extinguished or arc internally and short circuit.

The use of the shunt resistor, 15, and the capacitor, 16, is desirable though not essential. When used, the shunt resistor assists in reducing the inductive voltage which tends to accompany sudden changes in the armature current and also provides a path for harmonic currents, which cannot easily penetrate the auxiliary field winding. This is advantageous for otherwise these currents would build up heavy voltages across the current transformers. The shunt capacitor also provides a path for harmonic currents, and reduces their voltages.

By proper adjustment of the resistors 15, 16, and 11, the fraction of the excitation for the exciting motor supplied by the auxiliary field may be controlled.

To adapt my regulating device to single phase generators or motors, one of the transformers, 13, and sets of rectifiers, 14, would be eliminated.

The use of only one current transformer and set of rectifiers might be desirable in some cases and give satisfactory operation.

Automatic control of the shunt resistance, 15, in response to the field current or magnitude and power factor of the load may be desirable in some cases. It may also be desirable to use a "non-linear" type of material such as "Thyrite" for the shunt resistance, 15, or to use this material in parallel with a resistor of the normal type, to reduce voltages appearing across the current transformers during sudden load changes or on short circuit.

In addition to the specific form of my invention and modifications thereof discussed above, I am aware that my invention may be embodied in other specific forms without departing from the spirit of my invention. I therefore desire that the embodiments of my invention, described above, be considered as illustrative only, reference being had to the appended claims rather than the specific examples to indicate the scope of my invention.

I claim:

1. The combination of a synchronous machine comprising a field circuit and an armature circuit, an exciting generator for energizing said field circuit, a separately excited field circuit for said exciting generator, a sub-exciting generator for energizing said separately excited field circuit, variable resistance means positioned in said last-named field circuit, voltage regulating means responsive to the synchronous machine armature voltage for controlling said variable resistance, an auxiliary field circuit for said exciting generator, and rectifying means interconnecting said auxiliary field circuit and armature circuit for applying to said auxiliary field circuit current which varies directly with the current flowing through said armature circuit.

2. The combination of a synchronous machine comprising a field circuit and an armature circuit, an exciting generator for energizing said field circuit, a separately excited field circuit for said exciting generator, a sub-exciting generator for energizing said exciting generator field circuit, an auxiliary field circuit for said exciting generator adapted to supply a substantial portion of the excitation thereof at full load, and rectifying means interconnecting said auxiliary field circuit and armature circuit adapted to cause the current in the auxiliary field circuit to vary directly with the current flowing through said armature circuit whereby the stability of the synchronous machine is increased.

3. The combination of a synchronous alternating machine comprising a field circuit and an armature circuit, an exciting generator for energizing said field circuit, a main field circuit for said exciting generator, a sub-exciting generator for energizing said main field circuit, variable resistance means for controlling the current flowing in said main field circuit, said resistance adapted to be cut out upon decrease in synchronous machine armature voltage, an auxiliary field circuit for said exciting generator adapted to supply a substantial portion of the excitation thereof at full load, and rectifying means interconnecting said auxiliary field circuit and said armature circuit adapted to cause the current in the auxiliary field circuit to increase instantaneously with increase in armature current while machine armature voltage drop with decrease in armature current is maintained at a minimum.

ROBERT H. PARK.